UNITED STATES PATENT OFFICE.

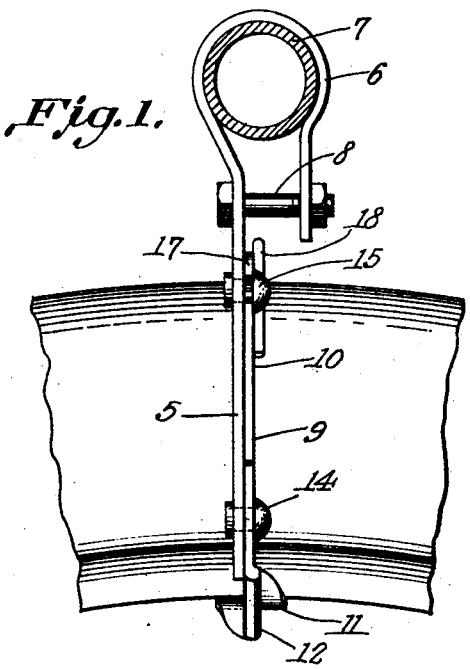
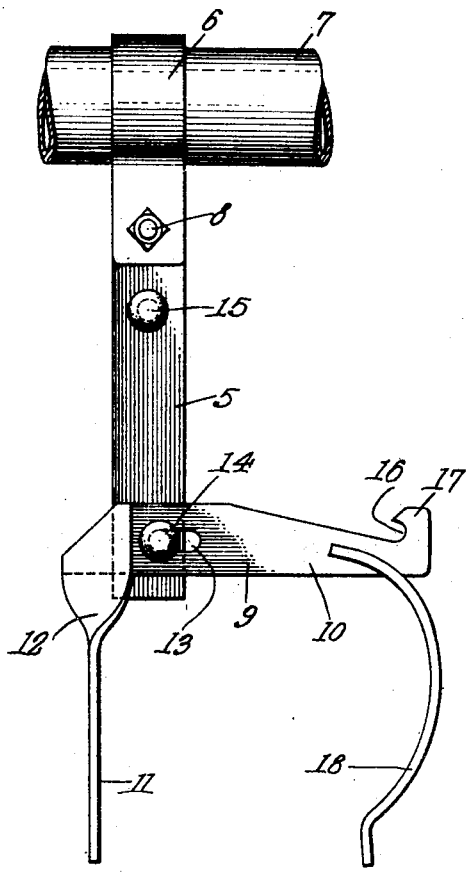
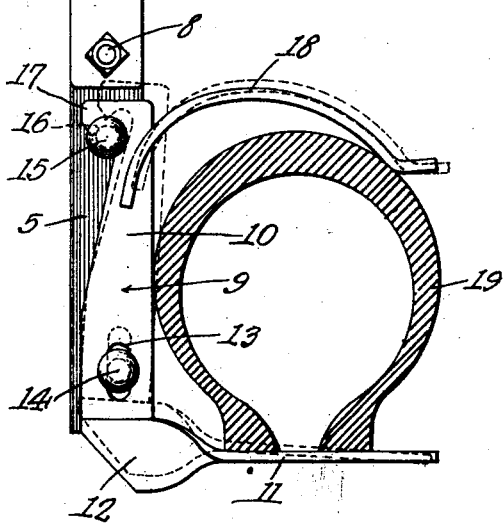

MILTON R. KAPP, OF VINITA, OKLAHOMA.

TIRE SUPPORT.

1,404,029.   Specification of Letters Patent.   Patented Jan. 17, 1922.

Application filed March 25, 1921. Serial No. 455,679.

*To all whom it may concern:*

Be it known that MILTON R. KAPP, a citizen of the United States, residing at Vinita, in the county of Craig and State of Oklahoma, has invented certain new and useful Improvements in Tire Supports, of which the following is a specification.

My invention relates to a hanger device, for supporting vehicle tires, such as the ordinary pneumatic tire, while not necessarily restricted to this use.

An important object of the invention is to provide a hanger device of the above mentioned character, so constructed that a number of the same may be arranged upon a suitable support, in close relation, and the tires held in a compact manner, in an out of the way position.

A further object of the invention is to provide a device of the above mentioned character, so constructed that the tire may be readily released by elevating it, and subsequently moving the tire downwardly, the tire being discharged from the swinging holding member.

A further object of the invention is to provide a device of the above mentioned character formed of few and simple parts, and which is strong, durable and cheap to manufacture.

Other objects and advantages of the invention will be apparent during the course of the following description.

In the accompanying drawings forming a part of this specification and in which like numerals are employed to designate like parts throughout the same, Fig. 1 is an edge elevation of a hanger device embodying my invention, Fig. 2 is a side elevation of the same, and, Fig. 3 is a similar view with the swinging supporting element in the lowered or discharged position.

In the drawings, wherein for the purpose of illustration is shown a preferred embodiment of my invention, the numeral 5 designates a relatively stationary upper member or support, preferably formed of a section of strap iron, bent at its upper end, into a loop 6, to receive a pipe 7, or other support. The end of the loop 6 is connected to the upper member 5 by a bolt 8 or the like, as shown, whereby the upper member may be clamped to the support 7, in a substantially vertical position.

The numeral 9 designates a lower member or pivoted support, which is L-shaped. This member may be formed of a section of strap iron, providing an upper arm 10, and a lower horizontal arm 11, the strap iron being twisted at 12, whereby the arms 10 and 11 have their edges arranged at a right angle.

The upper arm 9 is provided near its lower end with an elongated slot 13, receiving a headed stud or pivot element 14, rigidly secured to the lower end of the upper support 5. A second headed stud or latch element 15 is secured to the support 5, preferably near and beneath the bolt 8, and is adapted to be received within the jaw or recess 16 of a hooked head 17, formed upon the upper end of the arm 10, as shown.

Secured to the upper end of the arm 10 is a curved guard 18, which is preferably resilient. This guard overhangs the horizontal arm or base 11, as shown.

In use, a number of hanger devices is arranged upon the support 7, in an elevated position, such as near the ceiling of the store. These devices are arranged in close relation, so that the tires 19 held therein are disposed in close relation. When it is desired to remove a tire from the hanger device, the selected tire is shifted upwardly slightly, and by engaging the guard 18 it shifts the pivoted element 9 upwardly, the slot 13 providing for this upward movement with relation to the upper member or support 5. The hooked head 17 will now release the latch element 15, and the tire may be now lowered, the pivoted member 9 swinging upon the element 14 as a pivot, until it assumes the discharge position, in Figure 3. The tire may be now readily removed from the device, as the guard 18 is resilient. When it is desired to support a tire within the device, with the pivoted element 9 in the position shown in Figure 3, the tire is forced into the space between the arm 11 and guard 18. The upward movement of the tire swings the member 10 upon its pivot 14, and also moves it longitudinally with respect to the support 5. When in the vertical position, the tire may be manipulated, to lower the member 9, so that the head 17 will engage over the latch 15, again locking the member 9 in the active position.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A tire support comprising an upper supporting member provided with a headed stud, a swinging member, said swinging member being formed of a section of strap iron bent upon itself between its ends for forming a normally vertical arm, the bent over portions overlapping and arranged in substantially parallel planes, and a normally horizontal arm, the strap iron being twisted adjacent to the end of one bent over portion whereby the face of the horizontal arm is disposed at a right angle to the face of the vertical arm, said vertical arm having an elongated slot near its lower end and a hook at its upper end to engage over the headed stud, a pivot element secured to the upper supporting member, and a resilient curved guard secured to the upper portion of the vertical arm.

2. A tire support comprising an upper supporting member provided with a headed stud, a swinging member, said swinging member being formed of a section of strap iron bent upon itself between its ends for forming a normally vertical arm and a normally horizontal arm, the bent over portions overlapping and arranged in substantially parallel planes, the strap iron being twisted adjacent to the end of one bent over portion whereby the face of the horizontal arm is disposed at a right angle to the face of the vertical arm, said vertical arm having an elongated slot near its lower end and a hook at its upper end to engage over the headed stud, a pivot element secured to the upper supporting member, and a longitudinally curved resilient guard overhanging the horizontal arm and having its inner end arranged upon one face of the vertical arm and secured thereto.

In testimony whereof I affix my signature.

MILTON R. KAPP.